United States Patent Office  3,755,546
Patented Aug. 28, 1973

3,755,546
PROCESS FOR REMOVAL OF PHOSPHATES FROM SOLUTIONS CONTAINING FLUORIDE IONS
Bernard M. Lichstein, Elizabeth, and Cyril Woolf, Morristown, N.J., assignors to Allied Chemical Company, New York, N.Y.
No Drawing. Filed Aug. 31, 1971, Ser. No. 176,718
Int. Cl. C01b 25/32, 33/12; C01c 1/16
U.S. Cl. 423—470        7 Claims

ABSTRACT OF THE DISCLOSURE

A process for removing phosphate ion from fluoride ion-containing aqueous solutions is provided which comprises adding a water-soluble barium salt in the presence of sufficient ammonia to afford a pH of at least 8.5 and separating the thereby precipitated barium phosphate from the solution.

BACKGROUND OF THE INVENTION

This invention relates to a process for removing phosphate ion from aqueous fluoride ion-containing solutions. More particularly, the invention relates to the precipitation of phosphate ion from fluoride ion-containing aqueous solutions employing a water-soluble barium salt as the precipitant.

In the manufacture of phosphoric acid, the raw material, which can be phosphate rock, apatite, bones or other phosphatic material, generally also contains fluorine compounds. These raw materials on digestion, i.e. decomposition with a mineral acid such as sulfuric acid, give in addition to phosphoric acid, so-called den gases containing silicon tetrafluoride and fluorosilicic acid ($H_2SiF_6$). The silicon tetrafluoride is usually absorbed in water to give more fluorosilicic acid, which, upon neutralization with a base, usually ammonia, gives fluoride ion and silica. These fluorides are intermediates in the production of valuable chemicals of commerce such as synthetic cryolite ($Na_3AlF_6$), hydrogen fluoride and metal fluorides. The den gases, however, also contain entrained phosphate rock dust, phosphoric acid and other phosphorus containing compounds in varying concentrations which would constitute impurities in the fluorosilicic acid or ammonium fluoride and which must, therefore, be removed or at least reduced in concentration since their presence in the final fluorine compound product would be detrimental or even prevent the use thereof as desired. For example, cryolite is used as a "flux" in the electrolytic production of aluminum from bauxite. The presence of phosphorous compounds as impurities degrades the electrolytic characteristics of the cryolite by reducing the efficiency of the electrolytic cell and also adversely affects the purity of the aluminum produced. Similarly, in the production of hydrogen fluoride from ammonium fluoride (in turn derived from fluorosilicic acid), the usual conditions are low pH and high temperature. The presence of phosphate ion presents an additional source of corrosion under the stringent process conditions employed. It is, therefore, obvious that a process which permits the successful removal of phosphate ion from fluoride ion-containing solutions is highly desirable.

The characteristics of such a process, which could be applied to a fluoride ion-containing aqueous effluent, ordinarily that from phosphoric acid manufacture, would ideally consist of the following:

(1) A minimum number of extra steps, operations and reagents;
(2) The phosphate should be removed, preferably as an insoluble material, along with the silica precipitated at alkaline pH. Thus, in the stepwise neutralization of fluorosilicic acid with ammonia, the phosphate should be removed at the second stage as shown below:

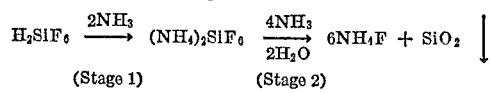

(3) Temperatures and procedures should not differ greatly from those employed for the recovery of fluoride values from fluorosilicic acid, and
(4) Excess precipitant should not remain in solution.

Various attempts have been made in the art to provide a process for the removal of phosphorus-containing impurities from fluorine-containing solutions; however, none have been devised which meet all of the above-enumerated requirements. All of the prior processes have in common at least two steps; one to remove silica and the other to remove phosphate ion, although they differ in the order of the steps utilized, the precipitant employed, the pH and temperature required and in the additional reactants, e.g. acids and bases which may be required to achieve the desired pH.

SUMMARY OF THE INVENTION

In accordance with the present invention, a process for the removal of phosphate ion from aqueous solutions containing fluoride and phosphate ion which meets all of the above-enumerated requirements is provided. Briefly stated, this process comprises the steps of adding a water-soluble barium salt to said aqueous solution in an amount at least stoichiometrically equivalent to the phosphate ion while maintaining the solution at a pH of at least about 8.5 and separating the resulting barium phosphate precipitate from the substantially phosphate-free solution thus produced. In an especially preferred embodiment, a phosphate ion-containing aqueous solution of, for example, fluorosilicic acid, is reacted with the barium salt and the pH of the solution is increased to at least about 8.5 by the addition of aqueous ammonia whereby barium phosphate and silica are substantially simultaneously precipitated in one step and thereafter separated from the aqueous ammonium fluoride solution, also simultaneously produced.

The phosphate ion is precipitated via the present process in an amount containing substantially all of the initial phosphate content of the solution.

DETAILED DESCRIPTION OF THE INVENTION

In the instant specification, the concentration of phosphorus is given in terms of phosphorous pentoxide ($P_2O_5$) in accordance with accepted usage, although it is to be understood that the phosphorus is in fact present as the phosphate anion. The term "substantially phosphorus-free", as employed herein, is meant to designate those solutions containing no more than 0.005% phosphorus by weight, calculated as $P_2O_5$. In most cases, after treatment in accordance with the instant invention, the $P_2O_5$ content will be essentially 0.000%.

It was surprising to discover that barium ion would function as a satisfactory precipitant in the above process, effecting complete and preferential precipitation of phosphate in the presence of fluoride, which also forms a rather insoluble barium salt. The presence of hydrated silica and of large amounts of ammonium ion would also be expected to exert an adverse effect on the precipitation and, indeed, it has been the belief in the art that the presence of excess ammonia, in general, prevents complete precipitation of any alkaline earth metal salts. (See for example Scott's Standard Method of Chemical Analysis, sixth edition, p. 140, Van Nostrand, New York, 1962.) Other members of Group II-A of the Periodic Table such as strontium, calcium, or lead, all form very insoluble phosphates. However, in attempts to preferentially precipitate phosphate employing the salts of these metals, a competition for the metal cation occurs between the phosphate and the fluoride ions. Since the fluoride ion is ordinarily in greater concentration in the solutions, the result is incomplete precipitation of phosphate or, at best, a very slow removal of phosphate due to the equilibration necessitated by the low solubility products of both the phosphate and fluoride.

The present method, by meeting all of the above-enumerated requirements, possesses several advantages over prior art methods.

First, phosphorous impurities in the dry fluoride after removal of phosphate by the invention range from about 0.000% to 0.005% $P_2O_5$. This is orders of magnitude lower than the best results reported in the prior art.

Second, the invention does not require an excess of precipitant since the reaction is stoichiometric between barium ions and phosphate ions resulting in a very insoluble precipitate, $Ba_3(PO_4)_2$, $Ksp=6\times10^{-39}$, and there are no barium ammonium phosphates of higher solubility which may cause the phosphate to redissolve in the presence of excess ammonium ions. Some prior art methods require a 3-fold excess of precipitant. Excess precipitant is not required in the instant process. Use of an excess of barium ion, however, is not detrimental except that some fluorine values are removed from the solution, and if excess barium ion is employed, it is effectively removed by the fluoride ion present since the solubility of $BaF_2$, $Ksp=1.73\times10^{-6}$, is low enough to remove any unused barium ion. At the same time, however, the solubility product is still sufficiently higher than that of barium phosphate so that precipitation of the fluoride is not competitive with that of the phosphate. Certain prior art procedures, in requiring an excess of precipitant, may give a final commercial product of undesirable properties. For example, where excess iron ion is employed as the precipitant, unreacted iron remains in the fluoride solution which, when employed to manufacture cryolite, gives the product a red-brown to buff color. Although this is not deleterious to its functioning in electrolysis applications, it lowers the marketability of the product since purity is often gauged on the basis of color by the consumer. Excess precipitant, in any event, which is not removed from the solution constitutes a contaminant which is undesirable, particularly since the purpose of the process is one of purification.

Third, control of pH in the instant invention is not difficult nor is it critical. Although best results are obtained herein at a pH of about 9.0, addition of an excess of ammonia is not harmful. In some prior art procedures, the operable pH range extends over only 1 to 2 units wherein the pH must not be less than nor greater than the indicated range since higher pH will cause the phosphate to redissolve to the extent that the invention is not beneficial in freeing the product of phosphate impurities. In other prior procedures requiring narrow acid to neutral ranges, there is an added difficulty in preventing the co-precipitation of ammonium fluorosilicate thereby resulting in the loss of fluorine values.

Fourth, the instant process requires fewer steps and reagents than those of the prior art to convert fluoride-containing solutions such as fluorosilicic acid to silica and phosphate-free ammonium fluoride. This invention merely requires the addition of a barium salt in the presence of sufficient ammonia or other base to raise the pH of the solution to at least about 8.5, preferably with mild heating to insure an easily filterable precipitate, followed by separation of a precipitate consisting of silica and barium phosphate and also barium fluoride if excess barium ion is present. A typical chemical reaction of the instant invention can be represented as follows:

$$H_2SiF_6+6NH_4OH+2PO_4^\equiv+3Ba^{++}\rightarrow$$
$$SiO_2\downarrow+4H_2O+6NH_4F+Ba_3(PO_4)_2\downarrow$$

Most prior art methods require at least two filtration stages: (1) At low pH, the fluorosilicic acid is converted to ammonium fluorosilicate and the phosphate is removed as the simple metal phosphate or metal ammonium phosphate (the pH required usually ranges from less than about 7.5 to quite acid pH); and (2) sufficient ammonia is then added to convert all the fluorine values to ammonium fluoride thereby precipitating the silicon of the fluorosilicate as silica which is then filtered off. Some other prior methods require yet additional steps such as reacidification after removal of the silica. Obviously, extra steps increase the expense of practicing a process and are undesirable.

In the practice of the present invention, any aqueous solution containing fluorine compounds and phosphate ions (usually as fluoride and orthophosphate ions) can be effectively treated. The concentration of fluoride or of phosphate is not critical to the invention. Generally, phosphate impurities in the solution to be treated can range from as low as 0.1 weight percent $P_2O_5$ or less, to as much as 2.0 weight percent or more.

Ammonia is added to the solution to be purified until a pH of at least about 8.5 is achieved. The pH range is not critical and may vary from about 8.5 to about 11 or more with a pH of about 9 being most preferable. The ammonia added can be of any convenient concentration; for example, from about 12% to about 28% aqueous ammonia or anhydrous ammonia can be passed directly into the aqueous solution to be purified. Concentrated solutions of aqueous ammonia, for example, about 15 N (28%), are preferred since such solutions will result in less liquid to be filtered off.

The barium salt can be added in aqueous solution or as the dry compound. Essentially, any water-soluble barium salt can be employed. The term "water-soluble," as used herein, connotes a solubility of at least 1 weight percent in water at 25° C. Examples of such compounds include acetate, butyrate, chlorate, formate, oxide, nitrate, chloride, bromide, hydroxide, cyanide, etc. of barium. Sufficient barium compound must be added to provide a number of equivalents of barium ion at least equal to the number of equivalents of phosphate ions present. An excess of barium ion can be used but is not necessary. Any excess will be precipitated as barium fluoride as discussed supra.

Precipitation of barium phosphate is immediate. The precipitate comprises barium phosphate and silica if fluorosilicic acid or a fluorosilicate was the source of the fluoride.

The temperature at which the reaction is effected is not critical. The reaction can be effected from just above the freezing point up to the boiling point of the solution. Low temperatures may give a less easily filtered precipitate while high temperatures may cause excessive loss of ammonia. The preferred temperature will, therefore, be from about 40° C. to about 80° C., which gives a well-formed, fast settling, easily filtered precipitate.

After precipitation, the mixture is preferably cooled to room temperature and filtered, giving a silica- and phosphate-free filtrate.

The following examples are given to further illustrate the invention.

EXAMPLE 1

A mixture of 40.8 parts (1.10 equivalent) of ammonium fluoride and 1.163 parts (0.0278 equivalent) of monoammonium phosphate were dissolved in 70 parts of water. This corresponds to dry ammonium fluoride containing about 1.9% of $P_2O_5$ as an impurity. A separate solution was made by dissolving 4.59 parts (0.0290 equivalent) of barium hydroxide in 75 parts of water. Both solutions were made ammoniacal to about pH 9 by the addition of sufficient 15 N ammonium hydroxide solution, after which the solutions were combined. Precipitation was immediately observed. The resulting mixture was diluted to 200 ml. and heated with stirring to 75° C. Coagulation was rapid to give a fine, microcrystalline, fast settling precipitate. The mixture was allowed to cool to room temperature, after which it was filtered, the precipitate washed with dilute ammonium hydroxide and the washings combined with the filtrate.

Analysis of the filtrate yielded a phosphate concentration corresponding to about 0.005% $P_2O_5$ in the dry fluoride. No barium was detected.

EXAMPLE 2

Example 1 was repeated except that the barium solution was prepared by dissolving 3.80 parts (0.0311 equivalent) of barium chloride in 75 parts of water.

Analysis of the filtrate showed no detectable phosphate or barium ion left in solution.

EXAMPLE 3

A series of mixtures were prepared, all containing the same quantity of ammonium fluoride. The amount of monoammonium phosphate and barium chloride was varied so that each mixture had less than the previous mixture. The procedure of Example 1 was repeated and the filtrate analyzed for phosphate ion. The following table gives the composition of each mixture and the phosphate analysis of the filtrate.

| Mixture No. | $NH_4F$, percent | $Ba^{++}$ equiv. | $PO_4^{-3}$ equiv. | As $P_2O_5$ in dry $NH_4F$, percent | $PO_4^{-3}$ in filtrate, percent |
|---|---|---|---|---|---|
| 1 | 10.1 | 0.0623 | 0.0555 | 9.48 | 0.000 |
| 2 | 20.4 | 0.0125 | 0.0111 | 2.05 | 0.000 |
| 3 | 20.4 | 0.00311 | 0.00222 | 0.416 | 0.000 |

EXAMPLE 4

A 30% solution of fluorosilicic acid (100 g.) was diluted with 50 g. of water. From a stock solution, an aliquot equivalent to 2.13 g. (0.0555 equivalent) of monoammonium phosphate was added. Concentrated ammonium hydroxide was added until a pH of 9 was achieved after which an aliquot from a stock solution equivalent to 7.6 g. (0.0623 equivalent) of barium chloride was added. The mixture was stirred and heated at 70° C. for about 30 minutes after which it was cooled to room temperature and filtered. The filtrate on analysis showed no phosphate or barium ion left in solution.

We claim:
1. A process for removing phosphate ion from an aqueous solution containing fluoride and phosphate ion comprising adding to said solution at a pH of at least 8.5 a water-soluble barium compound in an amount at least stoichiometrically equivalent to the phosphate ion present and separating the thereby resulting barium phosphate precipitate.
2. A process in accordance with claim 1 wherein said pH is about 9.0.
3. A process in accordance with claim 1 wherein said pH is achieved by the presence of aqueous ammonia in said solution.
4. A process in accordance with claim 1 wherein said barium compound is barium hydroxide, barium nitrate, barium oxide, barium chloride or barium carbonate.
5. A process in accordance with claim 1 wherein said solution is obtained by the absorption of den gases.
6. A process in accordance with claim 1 wherein said solution is maintained at a temperature of about 40° C. to about 80° C. during said addition.
7. A process for the preparation of silica and phosphate-free ammonium fluoride from a phosphate-containing aqueous solution of fluorosilicic acid comprising reacting said solution with a water-soluble barium compound in an amount at least stoichiometrically equivalent to the phosphate ion present in the presence of sufficient aqueous ammonia to provide a pH of at least 8.5 and separating the thereby precipitating silica and barium phosphate.

References Cited
UNITED STATES PATENTS

| | | | |
|---|---|---|---|
| 2,816,818 | 12/1957 | Gross | 23—88 |
| 2,865,711 | 12/1958 | Gloss et al. | 23—153 |
| 3,094,381 | 6/1963 | Cooper | 23—88 |
| 3,128,152 | 4/1964 | Secord et al. | 23—88 X |
| 3,201,193 | 8/1965 | Baumann | 23—88 |
| 3,595,785 | 7/1971 | Bruce et al. | 23—109 |

FOREIGN PATENTS

| | | | |
|---|---|---|---|
| 787,361 | 12/1957 | Great Britain | 23—109 |

EDWARD STERN, Primary Examiner

U.S. Cl. X.R.

423—158, 305, 311, 314, 339, 341